(12) United States Patent
Lu et al.

(10) Patent No.: US 12,133,202 B2
(45) Date of Patent: Oct. 29, 2024

(54) BANDWIDTH INDICATION WITH PREAMBLE PUNCTURING IN WIRELESS COMMUNICATIONS

(71) Applicant: MediaTek Singapore Pte. Ltd., Singapore (SG)

(72) Inventors: Kai Ying Lu, San Jose, CA (US); Yongho Seok, San Jose, CA (US); James Chih-Shi Yee, San Jose, CA (US); Jianhan Liu, San Jose, CA (US)

(73) Assignee: MediaTek Singapore Pte. Ltd., Singapore (SG)

( * ) Notice: Subject to any disclaimer, the term of this patent is extended or adjusted under 35 U.S.C. 154(b) by 142 days.

(21) Appl. No.: 17/552,222

(22) Filed: Dec. 15, 2021

(65) Prior Publication Data

US 2022/0201665 A1    Jun. 23, 2022

Related U.S. Application Data

(60) Provisional application No. 63/127,193, filed on Dec. 18, 2020.

(51) Int. Cl.
*H04W 72/044* (2023.01)
*H04L 5/00* (2006.01)
*H04W 4/06* (2009.01)

(52) U.S. Cl.
CPC ......... *H04W 72/044* (2013.01); *H04L 5/0092* (2013.01); *H04W 4/06* (2013.01)

(58) Field of Classification Search
None
See application file for complete search history.

(56) References Cited

U.S. PATENT DOCUMENTS

| | | | |
|---|---|---|---|
| 2019/0141570 A1* | 5/2019 | Verma | H04L 5/0007 |
| 2020/0037395 A1 | 1/2020 | Ko et al. | |
| 2021/0105667 A1* | 4/2021 | Li | H04L 5/0044 |
| 2021/0336720 A1* | 10/2021 | Chu | H04W 28/20 |
| 2021/0345403 A1* | 11/2021 | Kneckt | H04W 74/008 |

FOREIGN PATENT DOCUMENTS

| | | | |
|---|---|---|---|
| CN | 110621043 A | | 12/2019 |
| EP | 3927013 A1 | | 12/2021 |
| WO | WO 2019242658 A1 | | 12/2019 |

OTHER PUBLICATIONS

China National Intellectual Property Administration, First Office Action in China Patent Application No. 202111554644.1, Nov. 30, 2023.
Liwen Chu et al (NXP): "BW Negotiation, TXOP Protection with >160MHz PPDU and Puncture Operation", IEEE 802.11-20/0062r0.
European Patent Office, European Search Report for European Patent Application No. 21215121.1, May 13, 2022.
Liwen Chu (NXP); "protection with more than 160MHz PPDU and puncture operation", IEEE-SA Mentor, Piscataway, NJ, USA, vol. 802.11 EHT; 802.11be, Jan. 13, 2020 (Jan. 13, 2020), pp. 1-10, XP068165147.

* cited by examiner

*Primary Examiner* — Diane L Lo
(74) *Attorney, Agent, or Firm* — Andy M. Han; Han IP PLLC (57) ABSTRACT

Various schemes pertaining to bandwidth indication with preamble puncturing in wireless communications are described. An apparatus (e.g., a station (STA)) receives a control frame and, in response, transmits a control response frame. In the control frame, either or both of a scrambling sequence and a SERVICE field are set to indicate bandwidth and preamble puncturing information.

21 Claims, 9 Drawing Sheets

FIG. 1

| | First 7 bits of Scrambling Sequence | | | Reserved bits in Service field | | |
|---|---|---|---|---|---|---|
| | B0~B2 | B3~B6 | B7 | B8 | B9 | B10~B15 |
| Control Frame with BW/MRU Signaling (e.g., EHT RTS, EHT PS-Poll, EHT BAR, etc.) | ScramblingSequenceStart3 (non-zero integer) | MRU indication with BW ≤ 160MHz | 0 | 0 (BW ≤ 160MHz indication) | 0: at 5GHz band; 0 or 1: Static/Dynamic MRU indication at 6GHz band with BW ≤ 160MHz | Reserved |
| | | BW & MRU indication with BW > 160MHz | | 1 (BW > 160MHz indication) | 0 or 1: Static/Dynamic MRU indication at 6GHz band with BW > 160MHz | |
| Control Response Frame (e.g., EHT CTS) | ScramblingSequenceStart3 (non-zero integer) | MRU indication with BW ≤ 160MHz | 0 | Reserved | | |
| | | BW & MRU indication with BW > 160MHz | | | | |

| | First 7 bits of Scrambling Sequence | | | Reserved bits in SERVICE field | | |
|---|---|---|---|---|---|---|
| | B0~B2 | B3~B6 | B7~B12 | B13 | B14~B15 |
| Control Frame with BW/MRU Signaling (e.g. EHT RTS, EHT PS-Poll, EHT BAR, etc.) | scramblingSequenceStart3 (non-zero integer) | MRU indication at 5GHz band | Reserved at 5GHz band / MRU indication at 6GHz band | 0: at 5GHz band / 0 or 1: Static/Dynamic MRU indication at 6GHz band | Reserved |
| | | Reserved at 6GHz band | | | |
| Control Response Frame (e.g. EHT CTS) | scramblingSequenceStart3 (non-zero integer) | MRU indication at 5GHz band | Reserved at 5GHz band / MRU indication at 6GHz band | Reserved | |
| | | Reserved at 6GHz band | | | |

BANDWIDTH INDICATION WITH PREAMBLE PUNCTURING IN WIRELESS COMMUNICATIONS

CROSS REFERENCE TO RELATED PATENT APPLICATION

The present disclosure is part of a non-provisional patent application claiming the priority benefit of U.S. Provisional Patent Application No. 63/127,193, filed 18 Dec. 2020, the content of which being incorporated by reference in its entirety.

TECHNICAL FIELD

The present disclosure is generally related to wireless communications and, more particularly, to bandwidth indication with preamble puncturing in wireless communications.

BACKGROUND

Unless otherwise indicated herein, approaches described in this section are not prior art to the claims listed below and are not admitted as prior art by inclusion in this section.

In a wireless system, such as a wireless local area network (WLAN) under the Institute of Electrical and Electronics Engineers (IEEE) 802.11 specification(s), a multi-resource unit (MRU), as an aggregate of multiple resource units (RUs), with different tone combinations can be used to support dynamic preamble puncturing in order to improve spectral efficiency in a wide-bandwidth system. In a non-orthogonal frequency-divisional multiple access (non-OFDMA) extremely-high-throughput (EHT) physical-layer protocol data unit (PPDU) with a specific bandwidth, one or more MRU patterns are allowed to support dynamic preamble puncturing. For example, in a non-OFDMA 80 MHz EHT PPDU, 484+242-tone MRUs are allowed and supported, with 4 options. Additionally, in a non-OFDMA 160 MHz EHT PPDU, 996+484-tone MRUs as well as 996+484+242-tone MRUs are allowed and supported, with 4 MRU pattern options and 8 MRU pattern options, respectively. Moreover, in a non-OFDMA 320 MHz EHT PPDU, 2×996+484-tone MRUs, 3×996-tone MRUs, and 3×996+484-tone MRUs are allowed and supported, with 12 options, 4 options and 8 options, respectively.

Based on a transmission opportunity (TXOP) initiator's bandwidth and preamble puncturing information (e.g., MRU pattern(s)), a TXOP responder can dynamically negotiate bandwidth and MRU pattern with the TXOP initiator. In order to support bandwidth and MRU indication and negotiation, legacy format control frame exchange could be reused but with capability to indicate the MRU patterns (reflecting preamble puncturing) at both 5 GHz and 6 GHz frequency bands. For example, for a bandwidth equal to or less than 160 MHz in the 5 GHz band and the 6 GHz band, indication for 16 MRU patterns needs to be provided. For a bandwidth greater than 160 MHz in the 6 GHz band, indication for a bandwidth extension (320 MHz) and additional 24 MRU needs to be provided. However, presently there are many legacy stations (STAs) on the 5 GHz band with some IEEE 802.11ax legacy STAs on the 6 GHz band. However, it remains to be defined as to how to use legacy request-to-send and clear-to-send (RTS/CTS) and other control frame(s) for bandwidth and MRU indication to enable bandwidth/MRU negotiation and channel protection with legacy compatibility. Also, how to have a consistent design for both the 5 GHz band and the 6 GHz band remains to be defined. Therefore, there is a need for a solution of bandwidth indication with preamble puncturing in wireless communications.

SUMMARY

The following summary is illustrative only and is not intended to be limiting in any way. That is, the following summary is provided to introduce concepts, highlights, benefits and advantages of the novel and non-obvious techniques described herein. Select implementations are further described below in the detailed description. Thus, the following summary is not intended to identify essential features of the claimed subject matter, nor is it intended for use in determining the scope of the claimed subject matter.

An objective of the present disclosure is to provide schemes, concepts, designs, techniques, methods and apparatuses pertaining to bandwidth indication with preamble puncturing in wireless communications. Under various proposed schemes in accordance with the present disclosure, it is believed that aforementioned issues may be addressed or otherwise alleviated.

In one aspect, a method may involve receiving a control frame, with either or both of some of a scrambling sequence and a SERVICE field of the control frame being set to indicate bandwidth and preamble puncturing information. The method may also involve transmitting a control response frame responsive to receiving the control frame.

In another aspect, a method may involve transmitting a control frame, with either or both of a scrambling sequence and a SERVICE field of the control frame being set to indicate bandwidth and preamble puncturing information. The method may also involve receiving a control response frame responsive to transmitting the control frame.

It is noteworthy that, although description provided herein may be in the context of certain radio access technologies, networks and network topologies such as Wi-Fi, the proposed concepts, schemes and any variation(s)/derivative(s) thereof may be implemented in, for and by other types of radio access technologies, networks and network topologies such as, for example and without limitation, Bluetooth, Zig Bee, 5th Generation (5G)/New Radio (NR), Long-Term Evolution (LTE), LTE-Advanced, LTE-Advanced Pro, Internet-of-Things (IoT), Industrial IoT (IIoT) and narrowband IoT (NB-IoT). Thus, the scope of the present disclosure is not limited to the examples described herein.

BRIEF DESCRIPTION OF THE DRAWINGS

The accompanying drawings are included to provide a further understanding of the disclosure and are incorporated in and constitute a part of the present disclosure. The drawings illustrate implementations of the disclosure and, together with the description, serve to explain the principles of the disclosure. It is appreciable that the drawings are not necessarily in scale as some components may be shown to be out of proportion than the size in actual implementation to clearly illustrate the concept of the present disclosure.

DETAILED DESCRIPTION OF PREFERRED EMBODIMENTS

Detailed embodiments and implementations of the claimed subject matters are disclosed herein. However, it shall be understood that the disclosed embodiments and implementations are merely illustrative of the claimed subject matters which may be embodied in various forms. The present disclosure may, however, be embodied in many different forms and should not be construed as limited to the exemplary embodiments and implementations set forth herein. Rather, these exemplary embodiments and implementations are provided so that description of the present disclosure is thorough and complete and will fully convey the scope of the present disclosure to those skilled in the art. In the description below, details of well-known features and techniques may be omitted to avoid unnecessarily obscuring the presented embodiments and implementations.

Overview

Implementations in accordance with the present disclosure relate to various techniques, methods, schemes and/or solutions pertaining to bandwidth indication with preamble puncturing in wireless communications. According to the present disclosure, a number of possible solutions may be implemented separately or jointly. That is, although these possible solutions may be described below separately, two or more of these possible solutions may be implemented in one combination or another.

Figure 1:
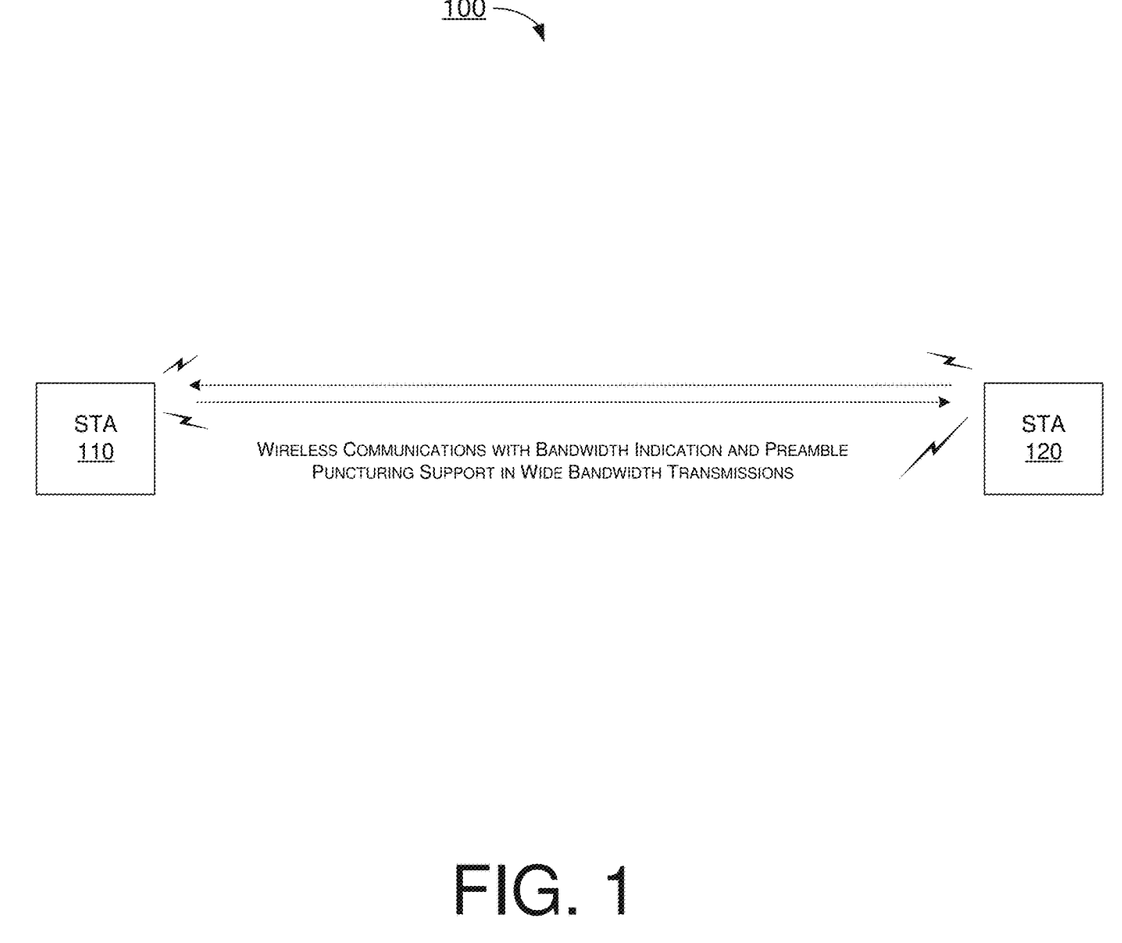
FIG. 1 is a diagram of an example network environment in which various solutions and schemes in accordance with the present disclosure may be implemented.

FIG. 1 illustrates an example network environment 100 in which various solutions and schemes in accordance with the present disclosure may be implemented. FIG. 2~FIG. 9 illustrate examples of implementation of various proposed schemes in network environment 100 in accordance with the present disclosure. The following description of various proposed schemes is provided with reference to FIG. 1-FIG. 9.

Referring to FIG. 1, network environment 100 may involve at least a STA 110 and a STA 120 may be communicating wirelessly with each other in accordance with one or more IEEE 802.11 standards (e.g., IEEE 802.11be). Each of STA 110 (herein interchangeably denoted as "STA1") and STA 120 (herein interchangeably denoted as "STA2") may function as an AP STA or a non-AP STA. Moreover, each of STA 110 and STA 120 may perform wide-bandwidth operations. Under various proposed schemes in accordance with the present disclosure, STA 110 and STA 120 may be configured to perform bandwidth indication with preamble puncturing in wireless communications in accordance with various proposed schemes described below.

Taking the bandwidth indication design as an example, the first 7 bits in a scrambling sequence are non-zero and, thus, the scrambler seed is non-zero. In a RTS, bits B0~B3 are used as a pseudorandom non-zero integer, bit B4 is used as a static/dynamic bandwidth indication, and bits B5~B6 are used for bandwidth indication. In a CTS, bits B0~B4 are used as a pseudorandom non-zero integer, and bits B5~B6 are used as a bandwidth indication. The indicated bandwidth can be 20 MHz, 40 MHz, 80 MHz, 160 MHz or 80+80 MHz.

Under a first proposed scheme in accordance with the present disclosure with respect to bandwidth and MRU indication, in a non-high-throughput (non-HT) control frame (e.g., RTS, power save poll (PS-Poll), block acknowledgement request (BAR) and so on) with bandwidth and MRU (BW/MRU) signaling, the first 7 bits of the scrambling sequence and some reserved bits in a SERVICE field may be used to indicate MRU patterns to support bandwidth and MRU indication and negotiation. Regarding MRU indication, part of the first 7 bits of the scrambling sequence (e.g., bits B3~B6) and part of the reserved bits in the SERVICE field may be used to indicate MRU patterns. For instance, for a bandwidth equal to or less than 160 MHz, several bits (e.g., B3~B6) in the first 7 bits of the scrambling sequence may be used to indicate MRU patterns at both the 5 GHz band (in which the operational bandwidth can be up to 160 MHz) and 6 GHz band (in which the operational bandwidth can be up to 320 MHz), with one bit (e.g., B7) of the reserved bits in the SERVICE field being set to a reserved value 0. Moreover, for a bandwidth greater than 160 MHz (e.g., 320 MHz), both the several bits (e.g., B3~B6) in the first 7 bits of the scrambling sequence and the one bit (e.g., B7) of the reserved bits in the SERVICE field may be used to indicate MRU patterns at the 6 GHz band. It is noteworthy that the 320 MHz bandwidth may be indicated as one MRU pattern.

Regarding bandwidth extension indication, one reserved bit (e.g., B8) of the SERVICE field may be used to indicate a bandwidth greater than 160 MHz. For instance, this reserved bit may be set to a reserved value 0 at the 5 GHz band (e.g., bandwidth always 160 MHz); the reserved bit may be set to a reserved value 0 at the 6 GHz band when the bandwidth is less than or equal to 160 MHz; and the reserved bit may be set to 1 at the 6 GHz band when the bandwidth is greater than 160 MHz. Regarding static and dynamic MRU negotiation, in a first option, one reserved bit (e.g., B9) of the SERVICE field may be used to indicate static/dynamic MRU negotiation. For instance, this reserved bit may be set to a reserved value 0 at the 5 GHz band (e.g., always static or always dynamic); and the reserved bit may be set to 0 or 1 to indicate static (e.g., when set to 0) or dynamic (e.g., when set to 1) MRU negotiation at the 6 GHz band. Regarding static and dynamic MRU negotiation, in a second option, one bit (e.g., B2) of the first 7 bits of the scrambling sequence may be used to indicate static/dynamic MRU negotiation. Under this option, bits B0~B1 of the first 7 bits are non-zero integer for scramblingsequenceStart. For instance, this bit may be set to 0 or 1 to indicate static (e.g., when set to 0) or dynamic (e.g., when set to 1) MRU negotiation at both the 5 GHz band and the 6 GHz band.

Figure 2:
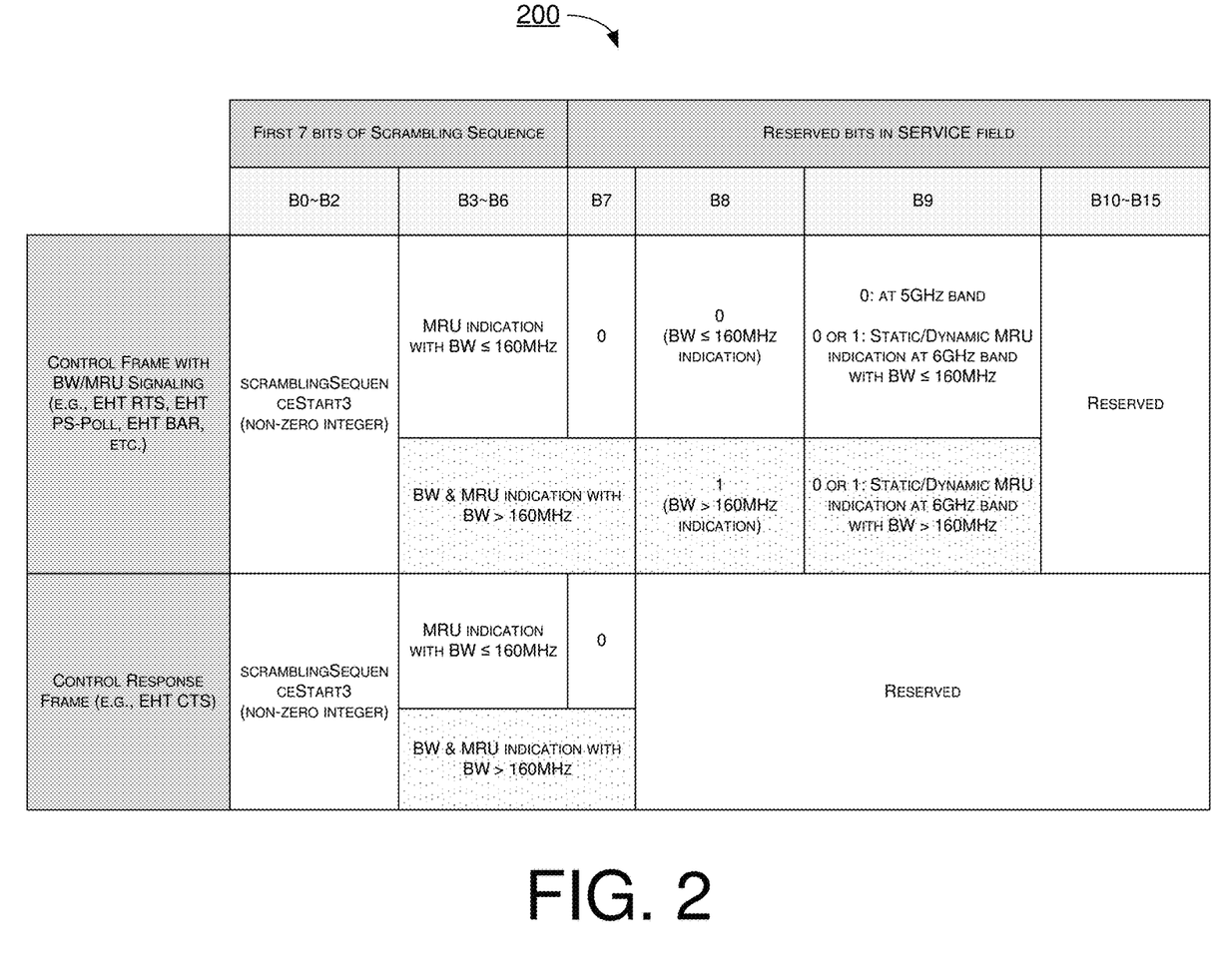
FIG. 2 is a diagram of an example design in accordance with the present disclosure.

Under this proposed scheme, in a non-HT control response frame (e.g., CTS), MRU indication may have the same design as with the control frame (e.g., RTS) described above, without bandwidth extension indication or static/dynamic MRU indication. Moreover, reserved values may be zeros. FIG. 2 illustrates an example design 200 for bandwidth and MRU indication under this proposed scheme.

Under a second proposed scheme in accordance with the present disclosure with respect to bandwidth and MRU indication, in a non-HT control frame (e.g., RTS, PS-Poll, and the like) with bandwidth and MRU signaling, the first 7 bits of the scrambling sequence and some reserved bits in a SERVICE field may be used to indicate MRU patterns to support bandwidth and MRU indication and negotiation. Regarding MRU indication, part of the first 7 bits of the scrambling sequence (e.g., bits B3~B6) and part of the reserved bits in the SERVICE field may be used to indicate MRU patterns. For instance, at the 5 GHz band, several bits (e.g., B3~B6) in the first 7 bits of the scrambling sequence may be used to indicate MRU patterns, with all reserved bits in the SERVICE field set to 0. Moreover, at the 6 GHz band, 6 bits (e.g., B7~B12) of the reserved bits in the SERVICE field may be used to indicate MRU patterns for all valid MRUs. It is noteworthy that bandwidths 20 MHz, 40 MHz, 80 MHz, 160 MHz and 320 MHz may be specific MRU patterns. The several bits (e.g., B3~B6) in the first 7 bits of the scrambling sequence may be reserved (e.g., set to random numbers).

Regarding indication of static and dynamic MRU negotiation, in a first option, one reserved bit (e.g., B13) of the SERVICE field may be used to indicate static/dynamic MRU negotiation. For instance, this reserved bit may be set to 0 at the 5 GHz band (e.g., always static or always dynamic). Moreover, the reserved bit may be set to 0 or 1 to indicate static (e.g., when set to 0) or dynamic (e.g., when set to 1) MRU negotiation at the 6 GHz band. Regarding static and dynamic MRU indication, in a second option, one bit (e.g., B2) of the first 7 bits of the scrambling sequence may be used to indicate static/dynamic MRU negotiation. Under this option, bits B0-B1 of the first 7 bits are non-zero integer for scramblingsequenceStart. For instance, this bit may be set to 0 or 1 to indicate static (e.g., when set to 0) or dynamic (e.g., when set to 1) MRU negotiation at both the 5 GHz band and the 6 GHz band.

Figure 3:
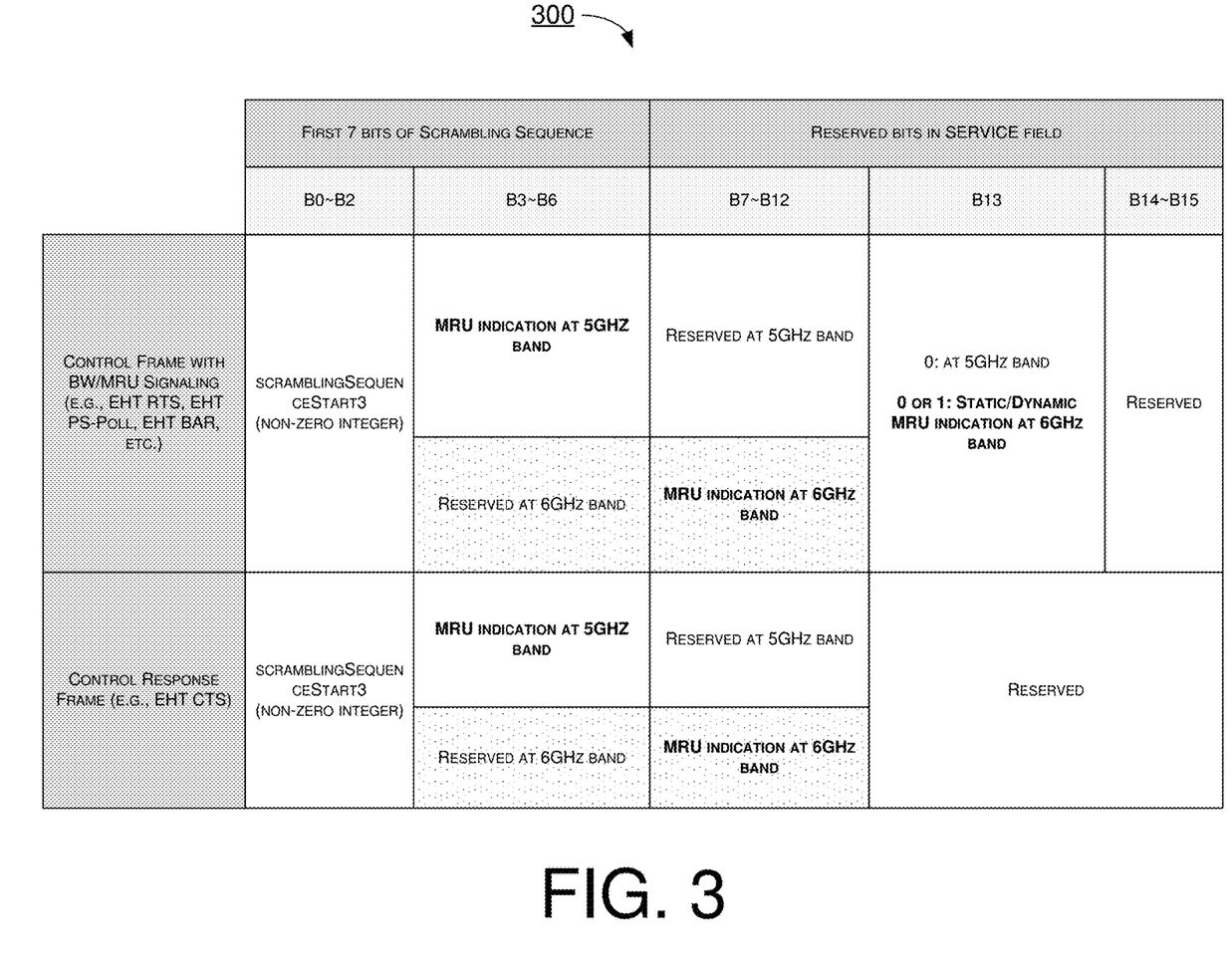
FIG. 3 is a diagram of an example design in accordance with the present disclosure.

Under this proposed scheme, in a non-HT control response frame (e.g., CTS), MRU indication may have the same design as with the control frame (e.g., RTS) described above, without static/dynamic MRU indication. Moreover, reserved values may be zeros. FIG. 3 illustrates an example design 300 for bandwidth and MRU indication under this proposed scheme.

As the first 7 bits of the scrambling sequence and/or the reserved bits in the SERVICE field of a control frame may be modified by an EHT device to carry the MRU indication, there needs to be a way to indicate to a recipient whether a given control frame has been modified (and thus is intended for EHT-capable device(s)) or has not been modified (and thus is intended for legacy device(s)). Under a proposed scheme in accordance with the present disclosure, there may be multiple approaches to provide such an indication.

Under a first approach, to indicate that the first 7 bits of the scrambling sequence and/or the reserved bits in the SERVICE field are modified by an EHT device to carry the MRU indication, an EHT initiator may set the Unicast/Multicast bit in the transmitter address (TA) and receiver address (RA) fields in a 48-bit medium access control (MAC) header of the control frame (e.g., RTS) carried in a non-HT PPDU sent to an EHT recipient. The EHT initiator may set the Unicast/Multicast bit to Multicast in the TA field to indicate the transmitter address of the control frame. The EHT initiator may also set the Unicast/Multicast bit to Multicast in the RA field to indicate the receiver address of the control frame. When the EHT recipient receives the control frame (e.g., RTS) with the Unicast/Multicast bit of the TA and RA fields set to Multicast, respectively, the EHT recipient may perform certain operations. For instance, the EHT recipient may change the Unicast/Multicast bit to Unicast before matching the RA with its MAC address. Moreover, in case that the RA matches the EHT recipient's MAC address, the EHT recipient may copy the TA and change the Unicast/Multicast bit in the TA field to Unicast before inserting it as the RA of the control response frame (e.g., CTS) carried in a non-HT PPDU sent to the EHT initiator.

Under a second approach, to indicate that the first 7 bits of the scrambling sequence and/or the reserved bits in the SERVICE field are modified by an EHT device to carry the MRU indication, an EHT initiator may swap the RA and TA fields in the control frame (e.g., RTS) carried in a non-HT PPDU sent to an EHT recipient. The EHT initiator may use the RA field to indicate the transmitter address of the control frame. The EHT initiator may also use the TA field to indicate the receiver address of the control frame. The EHT recipient may match the TA/RA of the received control frame with its MAC address. In case that the TA matches its MAC address, the EHT recipient may copy the RA and insert it as the RA of the control response frame (e.g., CTS) carried in a non-HT PPDU sent to the EHT initiator.

Under a third approach, to indicate that the first 7 bits of the scrambling sequence and/or the reserved bits in the SERVICE field are modified by an EHT device to carry the MRU indication, an EHT initiator may swap the RA and TA fields and set the Unicast/Multicast bit to Multicast in the TA field of the control frame (e.g., RTS) carried in a non-HT PPDU sent to an EHT recipient. The EHT initiator may use the RA field to indicate the transmitter address of the control frame. The EHT initiator may also use the TA field and set the Unicast/Multicast bit to Multicast to indicate the receiver address of the control frame. The EHT recipient may match the TA/RA of the received control frame with its MAC address. Specifically, the EHT recipient may change the Unicast/Multicast bit to Unicast before matching the TA with its MAC address. In case of the TA matching its MAC address, the EHT recipient may copy the RA and insert it as the RA of the control response frame (e.g., CTS) carried in a non-HT PPDU sent to the EHT initiator.

Under fourth approach, to indicate that the first 7 bits of the scrambling sequence and/or the reserved bits in the SERVICE field are modified by an EHT device to carry the MRU indication, an EHT initiator may swap the RA and TA fields and set the Unicast/Multicast bit to Multicast in the RA field of the control frame (e.g., RTS) carried in a non-HT PPDU sent to an EHT recipient. The EHT initiator may use the RA field and set the Unicast/Multicast bit to Multicast to indicate the transmitter address of the control frame. The EHT initiator may also use the TA field to indicate the receiver address of the control frame. The EHT recipient may match the TA/RA of the received control frame with its MAC address. In case of the TA matching its MAC address, the EHT recipient may copy the RA and change the Unicast/Multicast bit to Unicast before inserting it as the RA of the control response frame (e.g., CTS) carried in a non-HT PPDU sent to the EHT initiator.

Under a fifth approach, to indicate that the first 7 bits of the scrambling sequence and/or the reserved bits in the SERVICE field are modified by an EHT device to carry the MRU indication, an EHT initiator may swap the RA and TA fields and set the Unicast/Multicast bit to Multicast in the TA and RA fields of the control frame (e.g., RTS) carried in a non-HT PPDU sent to an EHT recipient. The EHT initiator may use the RA field and set the Unicast/Multicast bit to Multicast to indicate the transmitter address of the control frame. The EHT initiator may also use the TA field and set the Unicast/Multicast bit to Multicast to indicate the receiver address of the control frame. The EHT recipient may match the TA/RA of the received control frame with its MAC address. Specifically, the EHT recipient may change the Unicast/Multicast bit to Unicast before matching the TA with its MAC address. In case of the TA matching its MAC address, the EHT recipient may copy the RA and change the Unicast/Multicast bit to Unicast before inserting it as the RA of the control response frame (e.g., CTS) carried in a non-HT PPDU sent to the EHT initiator.

Under a sixth approach, to indicate that the first 7 bits of the scrambling sequence and/or the reserved bits in the SERVICE field are modified by an EHT device to carry the MRU indication, an EHT initiator may set a reserved bit or field in the MAC header of the control frame (e.g., RTS) carried in a non-HT PPDU sent to an EHT recipient.

Under a proposed scheme in accordance with the present disclosure, control frame exchange (e.g., RTS and CTS frame exchange) may be used for MRU pattern indication to support dynamic preamble puncturing. Under the proposed scheme, a control frame (e.g., EHT RTS) with BW/MRU signaling indication (e.g., based on one of the above-described six approaches) may be used to indicate that the control frame carries an MRU pattern indication. The control frame in a non-HT (e.g., legacy before IEEE 802.11n) duplicate format may be transmitted on 20 MHz channels with a preamble puncturing pattern as indicated by the MRU pattern indication in the control frame. The recipient of the control frame may determine the BW/MRU signaling indication of the received control frame based on one of the above-described six approaches with respect to BW/MRU signaling indication. The intended recipient may send a control response frame (e.g., CTS) in a non-HT duplicate format on the 20 MHz channels that are idle and indicated in the received control frame based on either of the above-described proposed schemes illustrated in FIG. 2 and FIG. 3 with respect to MRU indication and negotiation, depending on where it is static (e.g., only respond if matching) or dynamic MRU negotiation in implementation. For instance, if indicated as dynamic MRU negotiation, the control response frame may be transmitted in a subset of 20 MHz channels as indicated in the MRU indication of the control frame (e.g., RTS) if detected idle on the corresponding 20 MHz channels.

Under a proposed scheme in accordance with the present disclosure, an indication of static/dynamic MRU negotiation may be present only in the control frame (e.g., RTS). Alternatively, under some of the above-described six approaches in which, to indicate static/dynamic MRU negotiation, another way is to use BW/MRU signaling indication. For instance, in case one of the above-described six approaches is used as BW/MRU signaling indication with static MRU negotiation, any other option of those proposed schemes may be used as BW/MRU signaling indication with dynamic MRU negotiation.

Figure 4:
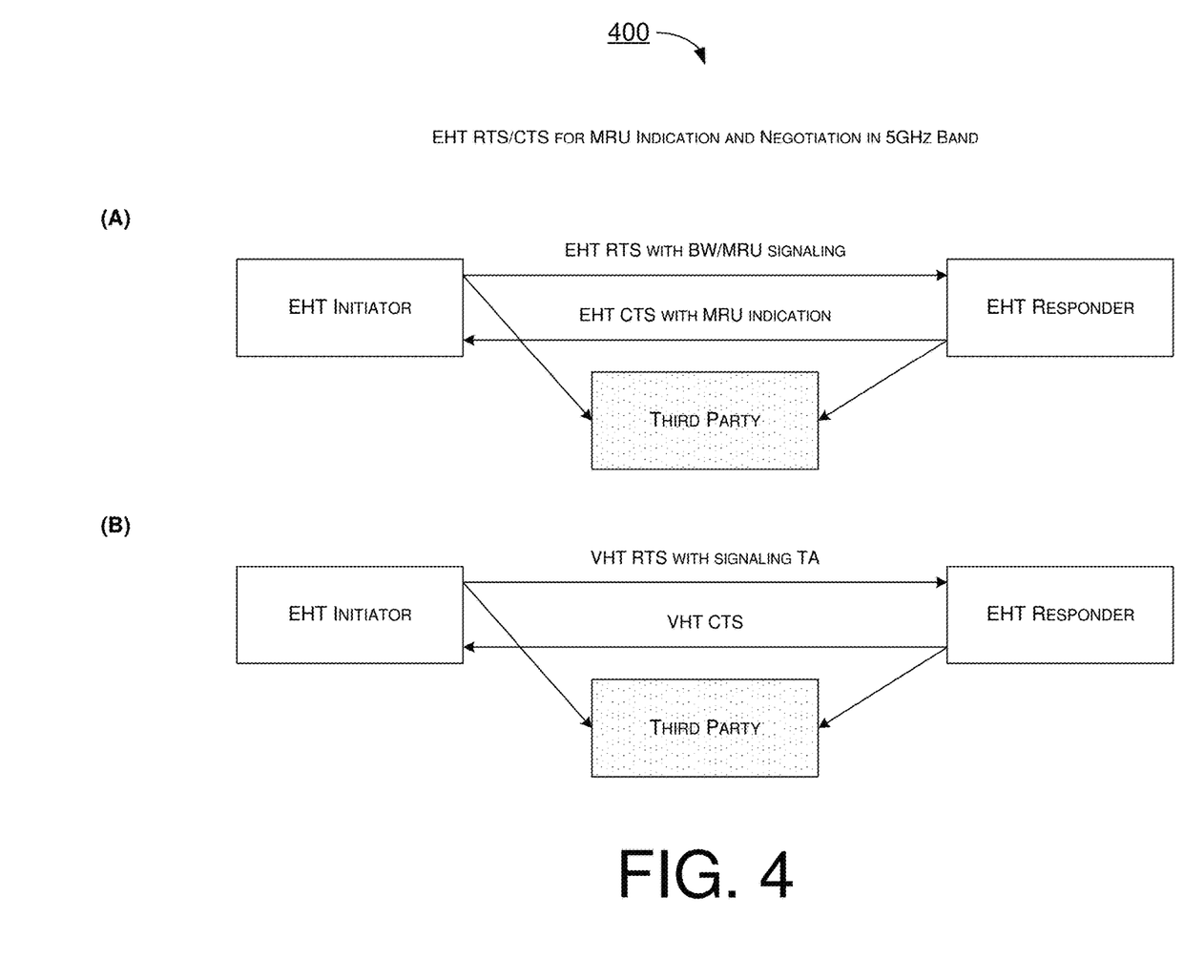
FIG. 4 is a diagram of an example scenario in accordance with the present disclosure.

FIG. 4 illustrates an example scenario 400 under a proposed scheme with respect to EHT RTS/CTS for MRU indication and negotiation in the 5 GHz band in accordance with the present disclosure. Under the proposed scheme, when an EHT initiator transmits an RTS frame with an MRU indication in the 5 GHz band, the EHT initiator may use an EHT RTS frame with BW/MRU signaling. Accordingly, an EHT responder may use an EHT CTS frame with an MRU indication. Part (A) of FIG. 4 shows an illustration of this example. Alternatively, the EHT initiator may transmit a very-high-throughput (VHT) legacy RTS frame with signaling TA to indicate bandwidth (e.g., 20 MHz, 40 MHz, 80 Mhz or 160 MHz). Accordingly, the EHT responder may use a VHT CTS frame. Part (B) of FIG. 4 shows an illustration of this example. In FIG. 4, the "third party" represents any non-intended third-party device that receives the signaling from the EHT initiator and EHT responder.

Figure 5:
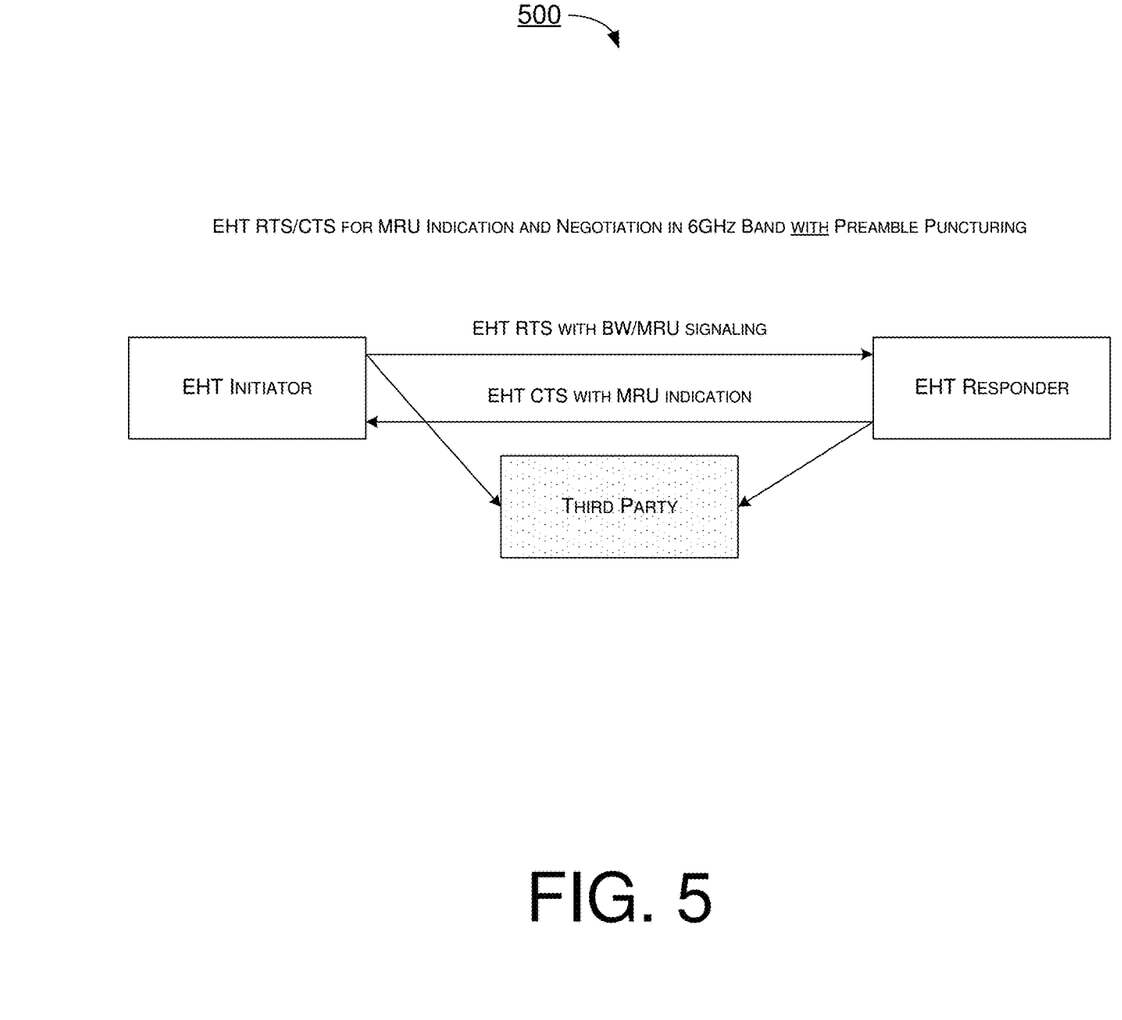
FIG. 5 is a diagram of an example scenario in accordance with the present disclosure.
Figure 6:
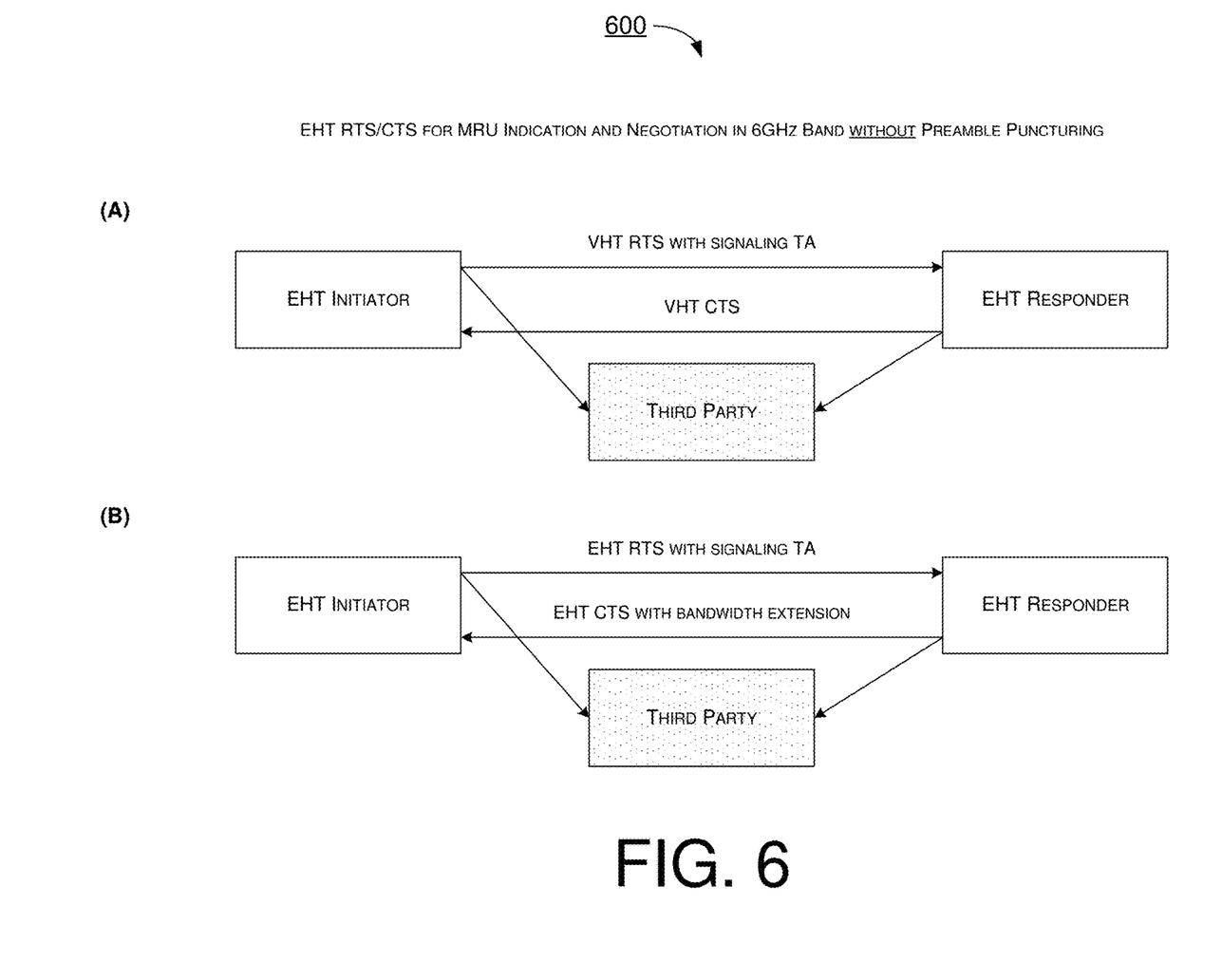
FIG. 6 is a diagram of an example scenario in accordance with the present disclosure.

FIG. 5 illustrates an example scenario 500 under a proposed scheme with respect to EHT RTS/CTS for MRU indication and negotiation in the 6 GHz band with preamble puncturing in accordance with the present disclosure. Under the proposed scheme, when an EHT initiator transmits an RTS frame with an MRU indication in the 6 GHz band, the EHT initiator may use an EHT RTS frame with BW/MRU signaling. The bandwidth (e.g., 20 MHz, 40 MHz, 80 MHz, 160 MHz or 320 MHz) may be indicated as a specific MRU pattern(s) together with other preamble puncturing MRUs. In the example shown in FIG. 5, the EHT responder may use an EHT CTS frame with an MRU indication. FIG. 6 illustrates an example scenario 600 under this proposed scheme with respect to EHT RTS/CTS for MRU indication and negotiation in the 6 GHz band without preamble puncturing. Under the proposed scheme, the EHT initiator transmits an RTS frame with signaling TA (e.g., with the Unicast/Multicast bit set to 1 in the TA field of the MAC header) to indicate a bandwidth of 20 MHz, 40 MHz, 80 MHz, 160 MHz and/or 320 MHz. As shown in part (A) of FIG. 6, in case the bandwidth is equal to or less than 160 MHz, the EHT initiator may transmit a VHT RTS with signaling TA, and the EHT responder may use a VHT CTS frame. As shown in part (B) of FIG. 6, in case the bandwidth is greater than 160 MHz (e.g., 320 MHz), the EHT initiator may transmit an EHT RTS with signaling TA (e.g., with a reserved bit in the SERVICE field set to 1 indicating bandwidth extension), and the EHT responder may use an EHT CTS frame with bandwidth extension. In FIG. 5 and FIG. 6, the "third party" represents any non-intended third-party device that receives the signaling from the EHT initiator and EHT responder.

Illustrative Implementations

Figure 7:
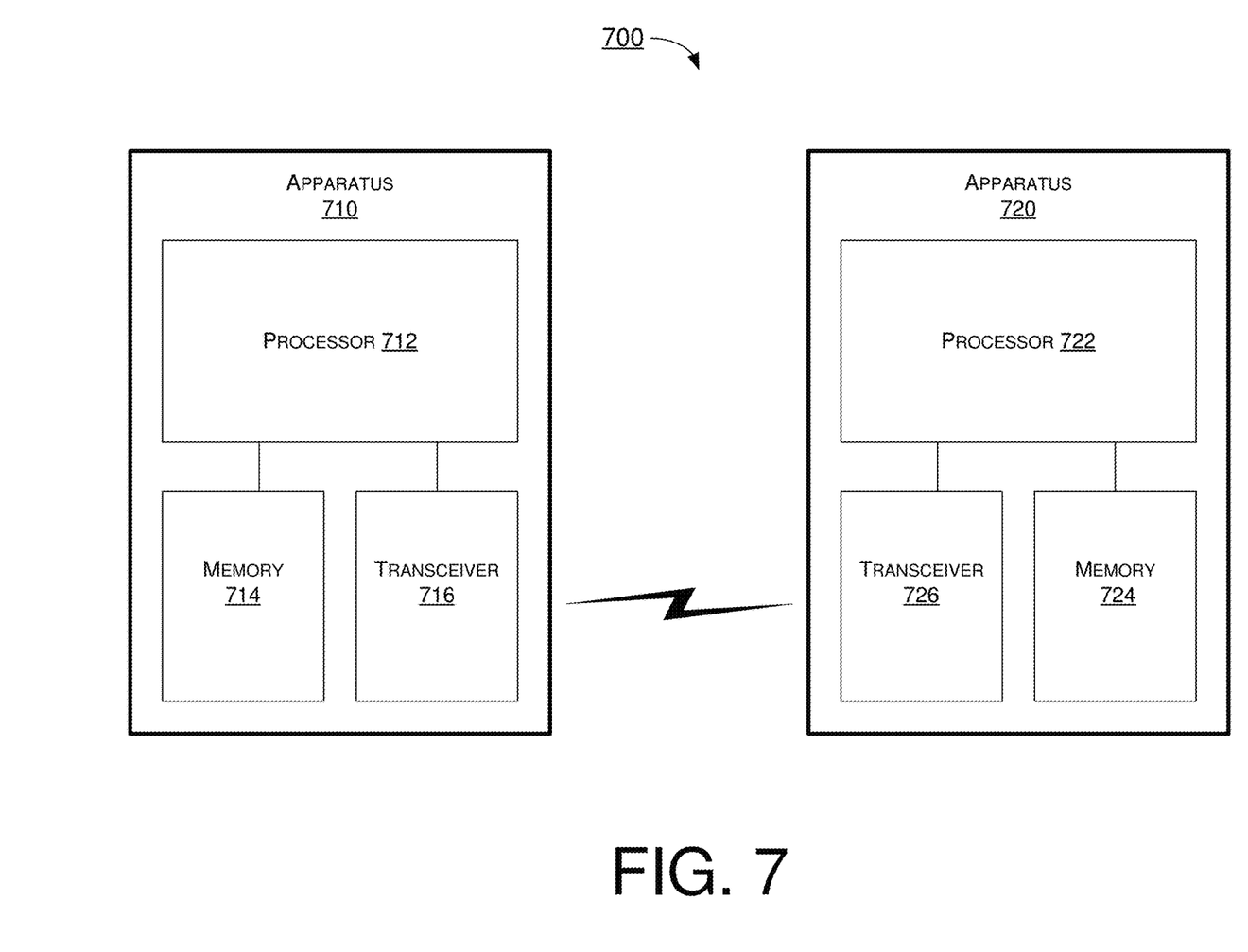
FIG. 7 is a block diagram of an example communication system in accordance with an implementation of the present disclosure.

FIG. 7 illustrates an example system 700 having at least an example apparatus 710 and an example apparatus 720 in accordance with an implementation of the present disclosure. Each of apparatus 710 and apparatus 720 may perform various functions to implement schemes, techniques, processes and methods described herein pertaining to bandwidth indication with preamble puncturing in wireless communications, including the various schemes described above with respect to various proposed designs, concepts, schemes, systems and methods described above as well as processes described below. For instance, apparatus 710 may be implemented in STA 110 and apparatus 720 may be implemented in STA 120, or vice versa.

Each of apparatus 710 and apparatus 720 may be a part of an electronic apparatus, which may be a non-AP STA or an AP STA, such as a portable or mobile apparatus, a wearable apparatus, a wireless communication apparatus or a computing apparatus. When implemented in a non-AP STA, each of apparatus 710 and apparatus 720 may be implemented in a smartphone, a smart watch, a personal digital assistant, a digital camera, or a computing equipment such as a tablet computer, a laptop computer or a notebook computer. Each of apparatus 710 and apparatus 720 may also be a part of a machine type apparatus, which may be an IoT apparatus such as an immobile or a stationary apparatus, a home apparatus, a wire communication apparatus or a computing apparatus. For instance, each of apparatus 710 and apparatus 720 may be implemented in a smart thermostat, a smart fridge, a smart door lock, a wireless speaker or a home control center. When implemented in or as a network apparatus, apparatus 710 and/or apparatus 720 may be implemented in a network node, such as an AP in a WLAN.

In some implementations, each of apparatus 710 and apparatus 720 may be implemented in the form of one or more integrated-circuit (IC) chips such as, for example and without limitation, one or more single-core processors, one or more multi-core processors, one or more reduced-instruction set computing (RISC) processors, or one or more complex-instruction-set-computing (CISC) processors. In the various schemes described above, each of apparatus 710 and apparatus 720 may be implemented in or as a non-AP STA or an AP STA. Each of apparatus 710 and apparatus 720 may include at least some of those components shown in FIG. 7 such as a processor 712 and a processor 722, respectively, for example. Each of apparatus 710 and apparatus 720 may further include one or more other components not pertinent to the proposed scheme of the present disclosure (e.g., internal power supply, display device and/or user interface device), and, thus, such component(s) of apparatus 710 and apparatus 720 are neither shown in FIG. 7 nor described below in the interest of simplicity and brevity.

In one aspect, each of processor 712 and processor 722 may be implemented in the form of one or more single-core processors, one or more multi-core processors, one or more RISC processors or one or more CISC processors. That is, even though a singular term "a processor" is used herein to refer to processor 712 and processor 722, each of processor 712 and processor 722 may include multiple processors in some implementations and a single processor in other implementations in accordance with the present disclosure. In another aspect, each of processor 712 and processor 722 may be implemented in the form of hardware (and, optionally, firmware) with electronic components including, for example and without limitation, one or more transistors, one or more diodes, one or more capacitors, one or more resistors, one or more inductors, one or more memristors and/or one or more varactors that are configured and arranged to achieve specific purposes in accordance with the present disclosure. In other words, in at least some implementations, each of processor 712 and processor 722 is a special-purpose machine specifically designed, arranged and configured to perform specific tasks including those pertaining to bandwidth indication with preamble puncturing in wireless communications in accordance with various implementations of the present disclosure.

In some implementations, apparatus 710 may also include a transceiver 716 coupled to processor 712. Transceiver 716 may include a transmitter capable of wirelessly transmitting and a receiver capable of wirelessly receiving data. In some implementations, apparatus 720 may also include a transceiver 726 coupled to processor 722. Transceiver 726 may include a transmitter capable of wirelessly transmitting and a receiver capable of wirelessly receiving data.

In some implementations, apparatus 710 may further include a memory 714 coupled to processor 712 and capable of being accessed by processor 712 and storing data therein. In some implementations, apparatus 720 may further include a memory 724 coupled to processor 722 and capable of being accessed by processor 722 and storing data therein. Each of memory 714 and memory 724 may include a type of random-access memory (RAM) such as dynamic RAM (DRAM), static RAM (SRAM), thyristor RAM (T-RAM) and/or zero-capacitor RAM (Z-RAM). Alternatively, or additionally, each of memory 714 and memory 724 may include a type of read-only memory (ROM) such as mask ROM, programmable ROM (PROM), erasable programmable ROM (EPROM) and/or electrically erasable programmable ROM (EEPROM). Alternatively, or additionally, each of memory 714 and memory 724 may include a type of non-volatile random-access memory (NVRAM) such as flash memory, solid-state memory, ferroelectric RAM (FeRAM), magnetoresistive RAM (MRAM) and/or phase-change memory.

Each of apparatus 710 and apparatus 720 may be a communication entity capable of communicating with each other using various proposed schemes in accordance with the present disclosure. For illustrative purposes and without limitation, a description of capabilities of apparatus 710, as STA 110 (e.g., an AP STA), and apparatus 720, as STA 120 (e.g., a non-AP STA), is provided below. It is noteworthy that, although the example implementations described below are provided in the context of WLAN, the same may be implemented in other types of networks.

Under a proposed scheme pertaining to bandwidth indication with preamble puncturing in wireless communications in accordance with the present disclosure, with apparatus 710 implemented in or as STA 110 and apparatus 720 implemented in or as STA 120 in network environment 100 in accordance with one or more of IEEE 802.11 standards, processor 722 of apparatus 720 may transmit, via transceiver 726, a control frame. Correspondingly, processor 712 of apparatus 710 may receive, via transceiver 716, the control frame. Either or both of (a) a scrambling sequence and (b) a SERVICE field of the control frame may be set to indicate bandwidth and preamble puncturing information. For instance, either one or more bits of first seven bits of the scrambling sequence and one or more bits in the SERVICE field of the control frame may be set to indicate the bandwidth and preamble puncturing information. In response to receiving the control frame, processor 712 may transmit, via transceiver 716, a control response frame. Correspondingly, processor 722 may receive, via transceiver 726, the control response frame in response to transmitting the control frame.

In some implementations, in the control frame, a Unicast/Multicast bit in each of a TA field and a RA field may be set to Multicast as an indication that either or both of the scrambling sequence and the SERVICE field of the control frame carrying bandwidth and preamble puncturing information. In such cases, in transmitting the control response frame, processor 712 may perform certain operations. For instance, processor 712 may change the Unicast/Multicast bit in the RA field to Unicast. Additionally, processor 712 may compare the RA field to a MAC address of apparatus 710 to determine whether the RA field matches the MAC address of apparatus 710. Moreover, in an event that the RA field matches the MAC address of the STA, processor 712 may perform certain operations. For instance, processor 712 may copy the TA field and change the Unicast/Multicast bit in the TA field to Unicast. Moreover, processor 712 may insert the TA field in a RA field of the control response frame. Furthermore, processor 712 may transmit the control response frame in a PPDU to apparatus 720.

In some implementations, in an event that the receiving and the transmitting are performed in a bandwidth less than or equal to 160 MHz: (a) four of first seven bits of the scrambling sequence of the control frame may be set to indicate an MRU or MRU pattern regarding preamble puncturing, and (b) four of first seven bits of a scrambling sequence of the control response frame may be set to indicate an MRU or MRU pattern regarding preamble puncturing of the control response frame. In such cases, one of the plurality of reserved bits in the SERVICE field of the control frame may be set to indicate either static or dynamic MRU negotiation at a 6 GHz band, and the plurality of reserved bits in the SERVICE field of the control frame may be set to a reserved value at a 5 GHz band.

In some implementations, in an event that the receiving or the transmitting is performed in a bandwidth greater than 160 MHz: (a) four of first seven bits of the scrambling sequence and a first reserved bit of the plurality of reserved bits in the SERVICE field of the control frame may be set to indicate a bandwidth and an MRU regarding preamble puncturing, and (b) four of first seven bits of the scrambling sequence and a first reserved bit of a plurality of reserved bits in a SERVICE field of the control response frame may be set to indicate a bandwidth and an MRU regarding preamble puncturing of the control response frame. In such cases, a second reserved bit of the plurality of reserved bits in the SERVICE field of the control frame may be set to 1 to indicate a bandwidth greater than 160 MHz. Moreover, a third reserved bit of the plurality of reserved bits in the SERVICE field of the control frame may be set to indicate either static or dynamic MRU negotiation at a 6 GHz band.

In some implementations, in an event that the receiving and the transmitting are performed in a 5 GHz band: (a) four of first seven bits of the scrambling sequence of the control frame may be set to indicate an MRU regarding preamble puncturing, and (b) four of first seven bits of a scrambling sequence of the control response frame may be set to indicate an MRU regarding preamble puncturing of the control response frame. In such cases, the plurality of reserved bits in the SERVICE field of the control frame may be set to a reserved value at a 5 GHz band.

In some implementations, in an event that the receiving and the transmitting are performed in a 6 GHz band: (a) at least six reserved bits (such as the first six reserved bits) of the plurality of reserved bits in the SERVICE field of the control frame may be set to indicate a bandwidth and an MRU regarding preamble puncturing, and (b) at least six reserved bits (such as the first six reserved bits) of a plurality of reserved bits in a SERVICE field of the control response frame may be set to indicate a bandwidth and an MRU regarding preamble puncturing of the control response frame. In such cases, a seventh reserved bit of the plurality of reserved bits in the SERVICE field of the control frame may be set to indicate either static or dynamic MRU negotiation at a 6 GHz band.

Illustrative Processes

Figure 8:
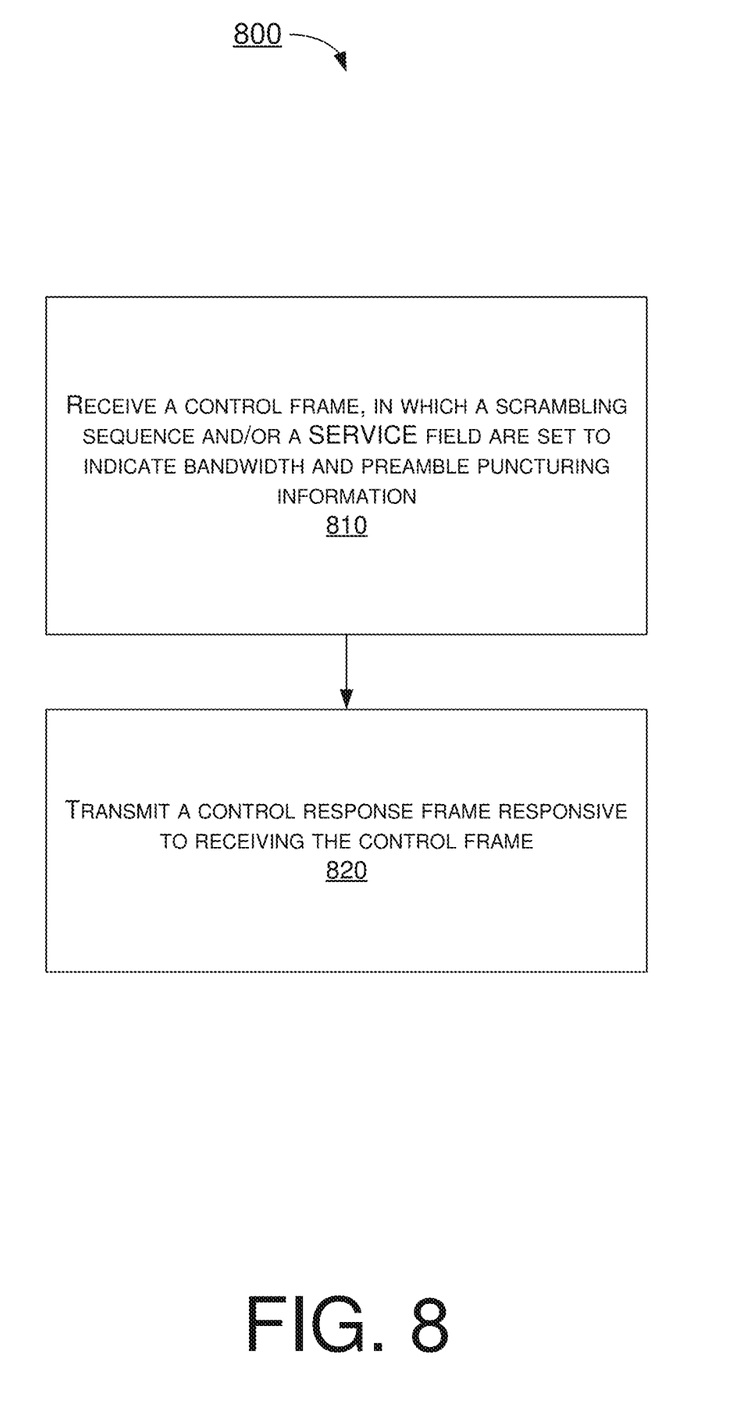
FIG. 8 is a flowchart of an example process in accordance with an implementation of the present disclosure.

FIG. 8 illustrates an example process 800 in accordance with an implementation of the present disclosure. Process 800 may represent an aspect of implementing various proposed designs, concepts, schemes, systems and methods described above. More specifically, process 800 may represent an aspect of the proposed concepts and schemes pertaining to bandwidth indication with preamble puncturing in wireless communications in accordance with the present disclosure. Process 800 may include one or more operations, actions, or functions as illustrated by one or more of blocks 810 and 820. Although illustrated as discrete blocks, various blocks of process 800 may be divided into additional blocks, combined into fewer blocks, or eliminated, depending on the desired implementation. Moreover, the blocks/sub-blocks of process 800 may be executed in the order shown in FIG. 8 or, alternatively in a different order. Furthermore, one or more of the blocks/sub-blocks of process 800 may be executed repeatedly or iteratively. Process 800 may be implemented by or in apparatus 710 and apparatus 720 as well as any variations thereof. Solely for illustrative purposes and without limiting the scope, process 800 is described below in the context of apparatus 710 implemented in or as STA 110 (e.g., AP STA) and apparatus 720 implemented in or as STA 120 (e.g., non-AP STA) of a wireless network such as a WLAN in network environment 100 in accordance with one or more of IEEE 802.11 standards. Process 800 may begin at block 810.

At 810, process 800 may involve processor 712 of apparatus 710 receiving, via transceiver 716, a control frame. Either or both of (a) a scrambling sequence and (b) a SERVICE field of the control frame may be set to indicate bandwidth and preamble puncturing information. For instance, either one or more bits of first seven bits of the scrambling sequence and one or more bits in the SERVICE field of the control frame may be set to indicate the bandwidth and preamble puncturing information. Process 800 may proceed from 810 to 820.

At 820, process 800 may involve processor 712 transmitting, via transceiver 716, a control response frame responsive to receiving the control frame.

In some implementations, in the control frame, a Unicast/Multicast bit in each of a TA field and a RA field may be set to Multicast as an indication that either or both of the scrambling sequence and the SERVICE field of the control frame carrying bandwidth and preamble puncturing information. In such cases, in transmitting the control response frame, process 800 may involve processor 712 performing certain operations. For instance, process 800 may involve processor 712 changing the Unicast/Multicast bit in the RA field to Unicast. Additionally, process 800 may involve processor 712 comparing the RA field to a MAC address of apparatus 710 to determine whether the RA field matches the MAC address of apparatus 710. Moreover, in an event that the RA field matches the MAC address of the STA, process 800 may involve processor 712 performing certain operations. For instance, process 800 may involve processor 712 copying the TA field and changing the Unicast/Multicast bit in the TA field to Unicast. Moreover, process 800 may involve processor 712 inserting the TA field in a RA field of the control response frame. Furthermore, process 800 may involve processor 712 transmitting the control response frame in a PPDU.

In some implementations, in an event that the receiving and the transmitting are performed in a bandwidth less than or equal to 160 MHz: (a) four of first seven bits of the scrambling sequence of the control frame may be set to indicate an MRU regarding preamble puncturing, and (b) four of first seven bits of a scrambling sequence of the control response frame may be set to indicate an MRU regarding preamble puncturing of the control response frame. In such cases, one of the plurality of reserved bits in the SERVICE field of the control frame may be set to indicate either static or dynamic MRU negotiation at a 6 GHz band. Moreover, the plurality of reserved bits in the SERVICE field of the control frame may be set to a reserved value at a 5 GHz band.

In some implementations, in an event that the receiving or the transmitting is performed in a bandwidth greater than 160 MHz: (a) four of first seven bits of the scrambling sequence and a first reserved bit of the plurality of reserved bits in the SERVICE field of the control frame may be set to indicate a bandwidth and an MRU regarding preamble puncturing, and (b) four of first seven bits of the scrambling sequence and a first reserved bit of a plurality of reserved bits in a SERVICE field of the control response frame may be set to indicate a bandwidth and an MRU regarding preamble puncturing of the control response frame. In such cases, a second reserved bit of the plurality of reserved bits in the SERVICE field of the control frame may be set to 1 to indicate a bandwidth greater than 160 MHz. Moreover, a third reserved bit of the plurality of reserved bits in the SERVICE field of the control frame may be set to indicate either static or dynamic MRU negotiation at a 6 GHz band.

In some implementations, in an event that the receiving and the transmitting are performed in a 5 GHz band: (a) four of first seven bits of the scrambling sequence of the control frame may be set to indicate an MRU regarding preamble puncturing, and (b) four of first seven bits of a scrambling sequence of the control response frame may be set to indicate an MRU regarding preamble puncturing of the control response frame. In such cases, the plurality of reserved bits in the SERVICE field of the control frame may be set to a reserved value at a 5 GHz band.

In some implementations, in an event that the receiving and the transmitting are performed in a 6 GHz band: (a) first six reserved bits of the plurality of reserved bits in the SERVICE field of the control frame may be set to indicate a bandwidth and an MRU regarding preamble puncturing, and (b) first six reserved bits of a plurality of reserved bits in a SERVICE field of the control response frame may be set to indicate a bandwidth and an MRU regarding preamble puncturing of the control response frame. In such cases, a seventh reserved bit of the plurality of reserved bits in the SERVICE field of the control frame may be set to indicate either static or dynamic MRU negotiation at a 6 GHz band.

Figure 9:
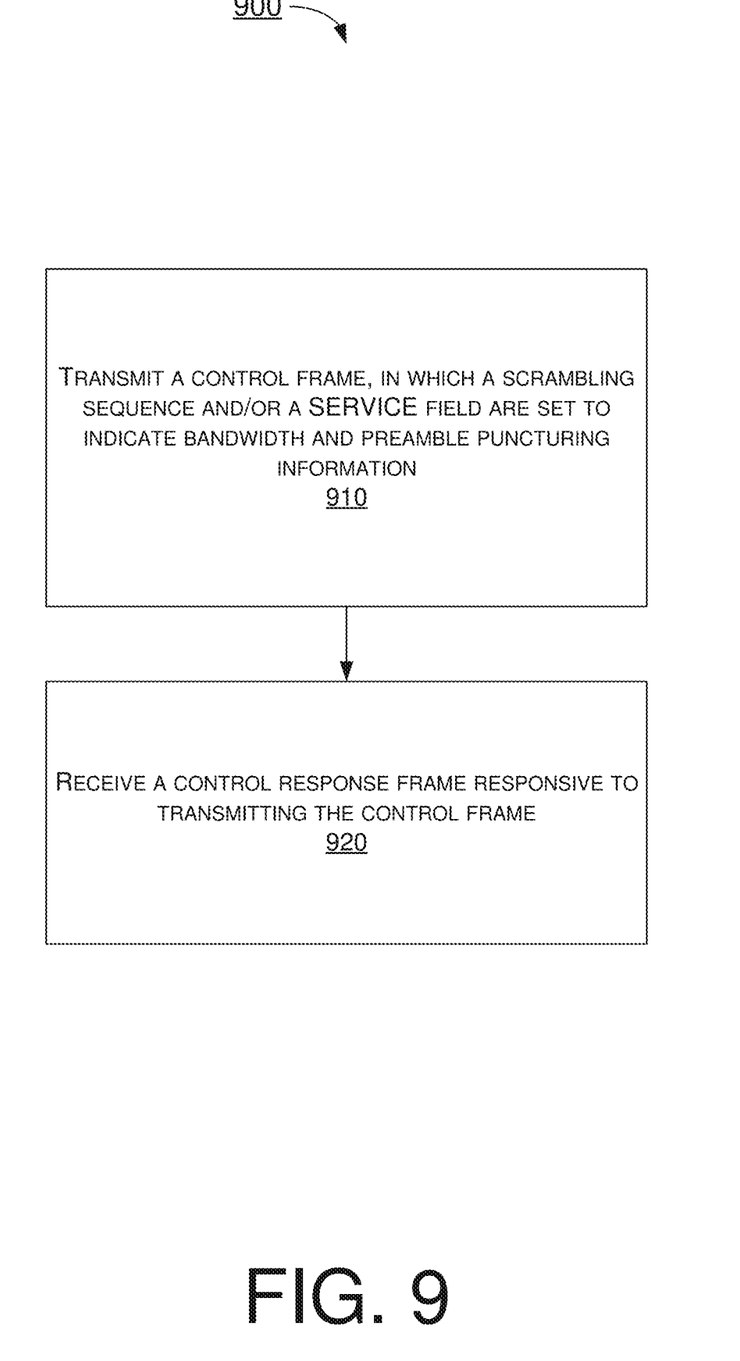
FIG. 9 is a flowchart of an example process in accordance with an implementation of the present disclosure.

FIG. 9 illustrates an example process 900 in accordance with an implementation of the present disclosure. Process 900 may represent an aspect of implementing various proposed designs, concepts, schemes, systems and methods described above. More specifically, process 900 may represent an aspect of the proposed concepts and schemes pertaining to bandwidth indication with preamble puncturing in wireless communications in accordance with the present disclosure. Process 900 may include one or more operations, actions, or functions as illustrated by one or more of blocks 910 and 920. Although illustrated as discrete blocks, various blocks of process 900 may be divided into additional blocks, combined into fewer blocks, or eliminated, depending on the desired implementation. Moreover, the blocks/sub-blocks of process 900 may be executed in the order shown in FIG. 9 or, alternatively in a different order. Furthermore, one or more of the blocks/sub-blocks of process 900 may be executed repeatedly or iteratively. Process 900 may be implemented by or in apparatus 710 and apparatus 720 as well as any variations thereof. Solely for illustrative purposes and without limiting the scope, process 900 is described below in the context of apparatus 710 implemented in or as STA 110 (e.g., AP STA) and apparatus 720 implemented in or as STA 120 (e.g., non-AP STA) of a wireless network such as a WLAN in network environment 100 in accordance with one or more of IEEE 802.11 standards. Process 900 may begin at block 910.

At 910, process 900 may involve processor 722 of apparatus 720 transmitting, via transceiver 726, a control frame. Either or both of some of (a) a scrambling sequence and (b) a SERVICE field of the control frame may be set to indicate bandwidth and preamble puncturing information. For instance, either one or more bits of first seven bits of the scrambling sequence and one or more bits in the SERVICE field of the control frame may be set to indicate the bandwidth and preamble puncturing information. Process 900 may proceed from 910 to 920.

At 920, process 900 may involve processor 722 receiving, via transceiver 726, a control response frame responsive to transmitting the control frame.

In some implementations, in the control frame, a Unicast/Multicast bit in each of a TA field and a RA field may be set to Multicast as an indication that either or both of the scrambling sequence and the SERVICE field of the control frame carrying bandwidth and preamble puncturing information.

In some implementations, in an event that the receiving and the transmitting are performed in a bandwidth less than or equal to 160 MHz: (a) four of first seven bits of the scrambling sequence of the control frame may be set to indicate an MRU regarding preamble puncturing, and (b) four of first seven bits of a scrambling sequence of the control response frame may be set to indicate an MRU regarding preamble puncturing of the control response frame. In such cases, one of the plurality of reserved bits in the SERVICE field of the control frame may be set to indicate either static or dynamic MRU negotiation at a 6 GHz band. Moreover, the plurality of reserved bits in the SERVICE field of the control frame may be set to a reserved value at a 5 GHz band.

In some implementations, in an event that the receiving or the transmitting is performed in a bandwidth greater than 160 MHz: (a) four of first seven bits of the scrambling sequence and a first reserved bit of the plurality of reserved bits in the SERVICE field of the control frame may be set to indicate a bandwidth and an MRU regarding preamble puncturing, and (b) four of first seven bits of the scrambling sequence and a first reserved bit of a plurality of reserved bits in a SERVICE field of the control response frame may be set to indicate a bandwidth and an MRU regarding preamble puncturing of the control response frame. In such cases, a second reserved bit of the plurality of reserved bits in the SERVICE field of the control frame may be set to 1 to indicate a bandwidth greater than 160 MHz. Moreover, a third reserved bit of the plurality of reserved bits in the SERVICE field of the control frame may be set to indicate either static or dynamic MRU negotiation at a 6 GHz band.

In some implementations, in an event that the receiving and the transmitting are performed in a 5 GHz band: (a) four of first seven bits of the scrambling sequence of the control frame may be set to indicate an MRU regarding preamble puncturing, and (b) four of first seven bits of a scrambling sequence of the control response frame may be set to indicate an MRU regarding preamble puncturing of the control response frame. In such cases, the plurality of reserved bits in the SERVICE field of the control frame may be set to a reserved value at a 5 GHz band.

In some implementations, in an event that the receiving and the transmitting are performed in a 6 GHz band: (a) first six reserved bits of the plurality of reserved bits in the SERVICE field of the control frame may be set to indicate a bandwidth and an MRU regarding preamble puncturing, and (b) first six reserved bits of a plurality of reserved bits in a SERVICE field of the control response frame may be set to indicate a bandwidth and an MRU regarding preamble puncturing of the control response frame. In such cases, a seventh reserved bit of the plurality of reserved bits in the SERVICE field of the control frame may be set to indicate either static or dynamic MRU negotiation at a 6 GHz band.

Additional Notes

The herein-described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality, and any two components capable of being so associated can also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Further, with respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

Moreover, it will be understood by those skilled in the art that, in general, terms used herein, and especially in the appended claims, e.g., bodies of the appended claims, are generally intended as "open" terms, e.g., the term "including" should be interpreted as "including but not limited to," the term "having" should be interpreted as "having at least," the term "includes" should be interpreted as "includes but is not limited to," etc. It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to implementations containing only one such recitation, even when the same claim includes the introductory phrases "one or more" or "at least one" and indefinite articles such as "a" or "an," e.g., "a" and/or "an" should be interpreted to mean "at least one" or "one or more;" the same holds true for the use of definite articles used to introduce claim recitations. In addition, even if a specific number of an introduced claim recitation is explicitly recited, those skilled in the art will recognize that such recitation should be interpreted to mean at least the recited number, e.g., the bare recitation of "two recitations," without other modifiers, means at least two recitations, or two or more recitations. Furthermore, in those instances where a convention analogous to "at least one of A, B, and C, etc." is used, in general such a construction is intended in the sense one having skill in the art would understand the convention, e.g., "a system having at least one of A, B, and C" would include but not be limited to systems that have A alone, B alone, C alone, A and B together, A and C together, B and C together, and/or A, B, and C together, etc. In those instances where a convention analogous to "at least one of A, B, or C, etc." is used, in general such a construction is intended in the sense one having skill in the art would understand the convention, e.g., "a system having at least one of A, B, or C" would include but not be limited to systems that have A alone, B alone, C alone, A and B together, A and C together, B and C together, and/or A, B, and C together, etc. It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

From the foregoing, it will be appreciated that various implementations of the present disclosure have been described herein for purposes of illustration, and that various modifications may be made without departing from the scope and spirit of the present disclosure. Accordingly, the various implementations disclosed herein are not intended to be limiting, with the true scope and spirit being indicated by the following claims.

What is claimed is:

1. A method, comprising:
    receiving a control frame; and
    transmitting a control response frame responsive to receiving the control frame,
    wherein either or both of a scrambling sequence and a SERVICE field of the control frame are set to indicate bandwidth and preamble puncturing information, and
    wherein, in an event that the receiving and the transmitting are performed in a 6 GHz band:
        at least six reserved bits of the plurality of reserved bits in the SERVICE field of the control frame are set to indicate a bandwidth and a multiple resource unit (MRU) or MRU pattern regarding preamble puncturing, and
        at least six reserved bits of a plurality of reserved bits in a SERVICE field of the control response frame are set to indicate a bandwidth and an MRU or MRU pattern regarding preamble puncturing of the control response frame.

2. The method of claim 1, wherein either one or more bits of first seven bits of the scrambling sequence and one or more bits in the SERVICE field of the control frame are set to indicate the bandwidth and preamble puncturing information.

3. The method of claim 1, wherein, in the control frame, a Unicast/Multicast bit in each of a transmitter address (TA) field and a receiver address (RA) field is set to Multicast as an indication that either or both of the scrambling sequence and the SERVICE field of the control frame carrying bandwidth and preamble puncturing information.

4. The method of claim 3, wherein the transmitting of the control response frame comprises:
    changing the Unicast/Multicast bit in the RA field to Unicast;
    comparing the RA field to a medium access control (MAC) address of a station (STA) that receives the control frame to determine whether the RA field matches the MAC address of the STA; and
    in an event that the RA field matches the MAC address of the STA:
        changing the Unicast/Multicast bit in the TA field to Unicast;
        inserting the changed TA field in a RA field of the control response frame; and
        transmitting the control response frame in a physical-layer protocol data unit (PPDU).

5. The method of claim 1, wherein, in an event that the receiving and the transmitting are performed in a bandwidth less than or equal to 160 MHz:
    four of first seven bits of the scrambling sequence of the control frame are set to indicate a multiple resource unit (MRU) or MRU pattern regarding preamble puncturing, and four of first seven bits of a scrambling sequence of the control response frame are set to indicate an MRU or MRU pattern regarding preamble puncturing of the control response frame.

6. The method of claim 5, wherein one of the plurality of reserved bits in the SERVICE field of the control frame is set to indicate either static or dynamic MRU negotiation at a 6 GHz band, and wherein the plurality of reserved bits in the SERVICE field of the control frame are set to a reserved value at a 5 GHz band.

7. The method of claim 1, wherein, in an event that the receiving or the transmitting is performed in a bandwidth greater than 160 MHz:
four of first seven bits of the scrambling sequence and a first reserved bit of the plurality of reserved bits in the SERVICE field of the control frame are set to indicate a bandwidth and a multiple resource unit (MRU) or MRU pattern regarding preamble puncturing, and
four of first seven bits of the scrambling sequence and a first reserved bit of a plurality of reserved bits in a SERVICE field of the control response frame are set to indicate a bandwidth and an MRU or MRU pattern regarding preamble puncturing of the control response frame.

8. The method of claim 7, wherein:
a second reserved bit of the plurality of reserved bits in the SERVICE field of the control frame is set to 1 to indicate a bandwidth greater than 160 MHz, and
a third reserved bit of the plurality of reserved bits in the SERVICE field of the control frame is set to indicate either static or dynamic MRU negotiation at a 6 GHz band.

9. The method of claim 1, wherein, in an event that the receiving and the transmitting are performed in a 5 GHz band:
four of first seven bits of the scrambling sequence of the control frame are set to indicate a multiple resource unit (MRU) or MRU pattern regarding preamble puncturing, and
four of first seven bits of a scrambling sequence of the control response frame are set to indicate an MRU or MRU pattern regarding preamble puncturing of the control response frame.

10. The method of claim 9, wherein the plurality of reserved bits in the SERVICE field of the control frame are set to a reserved value at a 5 GHz band.

11. The method of claim 1, wherein a seventh reserved bit of the plurality of reserved bits in the SERVICE field of the control frame is set to indicate either static or dynamic MRU negotiation at a 6 GHz band.

12. A method, comprising:
transmitting a control frame; and
receiving a control response frame responsive to transmitting the control frame,
wherein either or both of a scrambling sequence and a SERVICE field of the control frame are set to indicate bandwidth and preamble puncturing information, and
wherein, in an event that the receiving and the transmitting are performed in a 6 GHz band:
at least six reserved bits of the plurality of reserved bits in the SERVICE field of the control frame are set to indicate a bandwidth and a multiple resource unit (MRU) or MRU pattern regarding preamble puncturing, and
at least six reserved bits of a plurality of reserved bits in a SERVICE field of the control response frame are set to indicate a bandwidth and an MRU or MRU pattern regarding preamble puncturing of the control response frame.

13. The method of claim 12, wherein either one or more bits of first seven bits of the scrambling sequence and one or more bits in the SERVICE field of the control frame are set to indicate the bandwidth and preamble puncturing information.

14. The method of claim 12, wherein, in the control frame, a Unicast/Multicast bit in each of a transmitter address (TA) field and a receiver address (RA) field is set to Multicast as an indication that either or both of the scrambling sequence and the SERVICE field of the control frame carrying bandwidth and preamble puncturing information.

15. The method of claim 12, wherein, in an event that the receiving and the transmitting are performed in a bandwidth less than or equal to 160 MHz:
four of first seven bits of the scrambling sequence of the control frame are set to indicate a multiple resource unit (MRU) or MRU pattern regarding preamble puncturing, and
four of first seven bits of a scrambling sequence of the control response frame are set to indicate an MRU or MRU pattern regarding preamble puncturing of the control response frame.

16. The method of claim 15, wherein one of the plurality of reserved bits in the SERVICE field of the control frame is set to indicate either static or dynamic MRU negotiation at a 6 GHz band, and wherein the plurality of reserved bits in the SERVICE field of the control frame are set to a reserved value at a 5 GHz band.

17. The method of claim 12, wherein, in an event that the receiving or the transmitting is performed in a bandwidth greater than 160 MHz:
four of first seven bits of the scrambling sequence and a first reserved bit of the plurality of reserved bits in the SERVICE field of the control frame are set to indicate a bandwidth and a multiple resource unit (MRU) or MRU pattern regarding preamble puncturing, and
four of first seven bits of the scrambling sequence and a first reserved bit of a plurality of reserved bits in a SERVICE field of the control response frame are set to indicate a bandwidth and an MRU or MRU pattern regarding preamble puncturing of the control response frame.

18. The method of claim 17, wherein:
a second reserved bit of the plurality of reserved bits in the SERVICE field of the control frame is set to 1 to indicate a bandwidth greater than 160 MHz, and
a third reserved bit of the plurality of reserved bits in the SERVICE field of the control frame is set to indicate either static or dynamic MRU negotiation at a 6 GHz band.

19. The method of claim 12, wherein, in an event that the receiving and the transmitting are performed in a 5 GHz band:
four of first seven bits of the scrambling sequence of the control frame are set to indicate a multiple resource unit (MRU) regarding preamble puncturing, and
four of first seven bits of a scrambling sequence of the control response frame are set to indicate an MRU or MRU pattern regarding preamble puncturing of the control response frame,
wherein the plurality of reserved bits in the SERVICE field of the control frame are set to a reserved value at a 5 GHz band.

20. The method of claim 12, wherein a seventh reserved bit of the plurality of reserved bits in the SERVICE field of the control frame is set to indicate either static or dynamic MRU negotiation at a 6 GHz band.

21. An apparatus, comprising:
- a transceiver configured to communicate wirelessly; and
- a processor coupled to the transceiver and configured to perform operations comprising:
  - receiving, via the transceiver, a control frame; and
  - transmitting, via the transceiver, a control response frame responsive to receiving the control frame,
- wherein either or both of a scrambling sequence and a SERVICE field of the control frame are set to indicate bandwidth and preamble puncturing information, and
- wherein, in an event that the receiving and the transmitting are performed in a 6 GHz band:
  - at least six reserved bits of the plurality of reserved bits in the SERVICE field of the control frame are set to indicate a bandwidth and a multiple resource unit (MRU) or MRU pattern regarding preamble puncturing, and
  - at least six reserved bits of a plurality of reserved bits in a SERVICE field of the control response frame are set to indicate a bandwidth and an MRU or MRU pattern regarding preamble puncturing of the control response frame.

* * * * *